L. P. BROWN.
COLLAPSIBLE BOTTLE OR RECEPTACLE.
APPLICATION FILED OCT. 17, 1908.
926,237.
Patented June 29, 1909.
2 SHEETS—SHEET 1.
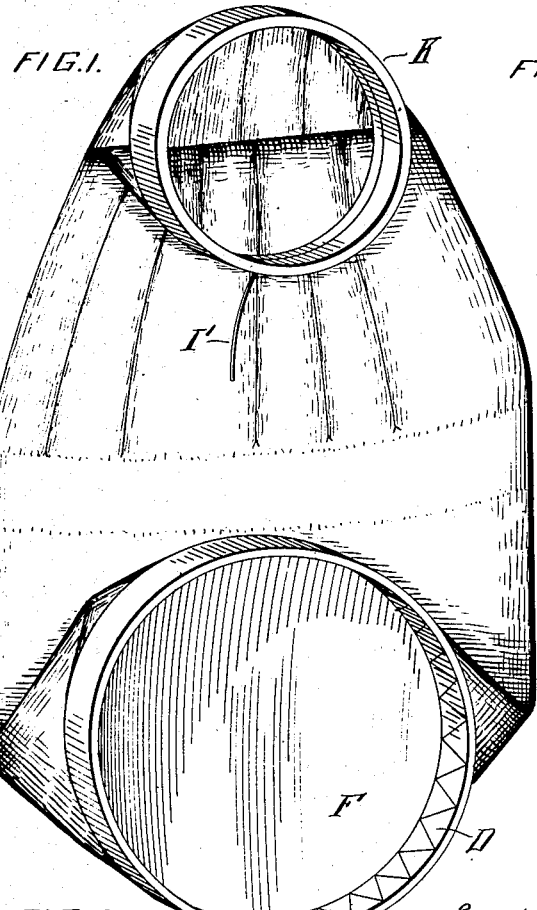
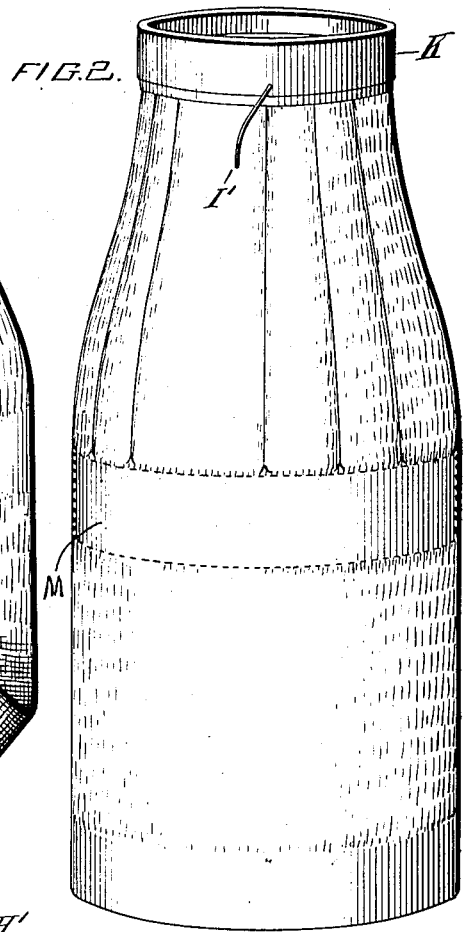
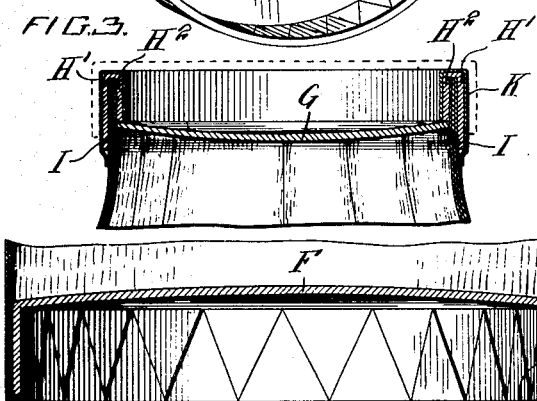
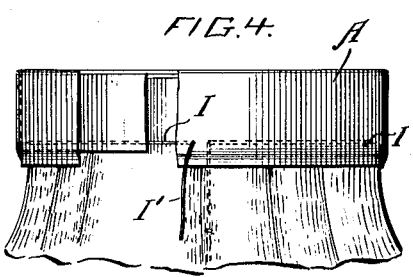
WITNESSES:
INVENTOR
Luther P. Brown,
BY
Attorney

L. P. BROWN.
COLLAPSIBLE BOTTLE OR RECEPTACLE.
APPLICATION FILED OCT. 17, 1908.

926,237.

Patented June 29, 1909.
2 SHEETS—SHEET 2.

WITNESSES

INVENTOR
Luther P. Brown,
BY
Attorney

UNITED STATES PATENT OFFICE.

LUTHER P. BROWN, OF PORT HURON, MICHIGAN.

COLLAPSIBLE BOTTLE OR RECEPTACLE.

No. 926,237.  Specification of Letters Patent.  Patented June 29, 1909.

Application filed October 17, 1908. Serial No. 458,277.

*To all whom it may concern:*

Be it known that I, LUTHER P. BROWN, a citizen of the United States, residing at Port Huron, in the county of St. Clair and State of Michigan, have invented certain new and useful Improvements in Collapsible Bottles or Receptacles; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in collapsible or folding paper receptacles designed especially for use as milk bottles, and the object in view is to provide a receptacle of this nature which may be made preferably of paper of one or more thicknesses and so constructed that it may be knocked down and reduced to a compact form for convenience in shipping and economy in space.

The invention consists further in a folding or collapsible bottle of this nature which is preferably designed to be coated with a water-proofing material and so constructed that the top of the bottle may be severed by a wire which is incorporated within the material of which the receptacle is constructed.

The invention comprises various details of construction and arrangements of parts which will be hereinafter fully described and then specifically defined in the appended claim.

I illustrate my invention in the accompanying drawings, in which:—

Figure 6:
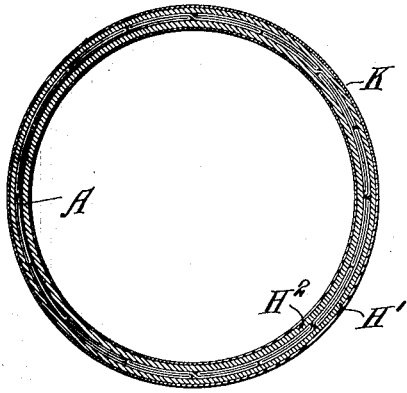
Figure 7:
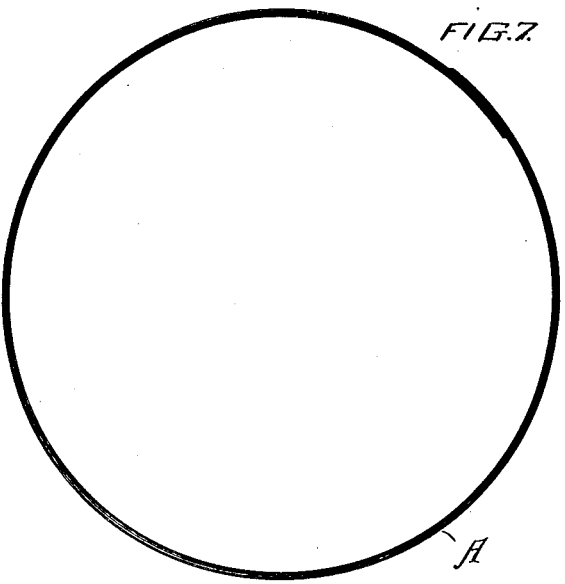
Figure 8:
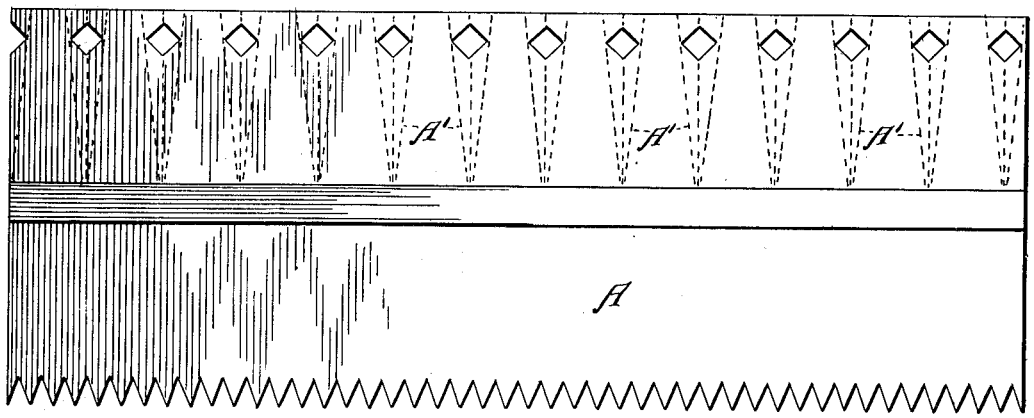
Figure 9:
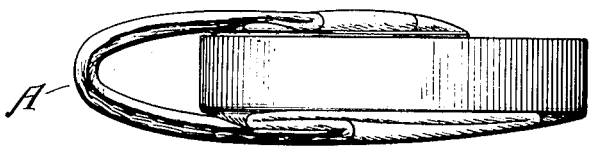

Figure 1 is a perspective view showing the bottle collapsed. Fig. 2 is a similar view showing the same distended for use. Fig. 3 is a sectional view through the upper portion of the bottle showing a disk closure therefor. Fig. 4 is a sectional view showing the means for removing the top of the bottle. Fig. 5 is a sectional view through the lower part of the receptacle. Fig. 6 is a sectional view horizontally through the upper portion of the bottle. Fig. 7 is a sectional view showing parts of the surrounding walls of the bottle which overlap. Fig. 8 is a blank from which the bottle is made, and Fig. 9 is a detail view showing the manner of folding the bottle after the same has been collapsed.

Reference now being had to the details of the drawings by letter, A designates a blank of paper or any other suitable material and which may be made up of one or more thicknesses as may be desired and is adapted to be bent along the oblique lines A' in order that the receptacle may be folded to form plaits and the contracted end about which a band K passes and is secured thereto by any suitable means, such as an adhesive material. The opposite end or bottom of the receptacle has the inturned toothed edge D, and F designates the bottom of the receptacle having its marginal edge stretched to form a flange E which is engaged by the teeth D and the surrounding wall of the receptacle in the manner shown in Fig. 5 of the drawings, thus raising the bottom a slight distance above the article upon which the flange rests. The neck of the bottle has a collar, the inner portion $H^2$ of which extends inside of said flange while the outer portion H' extends below the inner end of the covering. A wire I is passed about the neck of the bottle and one of its ends projects through the outer fold H' of the collar and its other end is embedded within the wall of the receptacle, as shown clearly in Fig. 4 of the drawings. By passing the wire about the neck of the bottle and drawing the same taut, a beading or shoulder will be formed intermediate which and the lower end of the inner downwardly turned portion of said collar, a disk closure G may be inserted and held. For the purpose of strengthening the bottle and insuring its being held in shape when in use, I provide a suitable band M, this band being made preferably of paper and is interposed between the two thicknesses of material of which the bottle is composed. In Fig. 2 of the drawings, I have shown a bottle provided with one of these bands. It is at once evident that two or more bands may be used if desired.

If desired, a flanged cap may be fitted over the band of the bottle and the collar may be dispensed with. By the utilization of a flanged cap, foreign matter will be prevented from entering the receptacle. When it is desired to sever the top of the bottle, it may be done by a person pulling upon the end I' of the wire, causing the top to be detached and rendering the bottle unfit for use a second time, thus affording an efficient non-refillable receptacle or bottle.

It is my purpose to coat the surfaces of my collapsible bottle with a suitable waterproofing material so that the liquid contents of the bottle may be retained and not affected in any way by the material of which the bottle is made.

What I claim to be new is:—

A collapsible bottle having a wall of paper material with a rigid bottom, the neck of the bottle being formed by plaiting one end thereof, a band surrounding the neck end of the bottle, a wire surrounding the neck end of the bottle and affording means for severing the same, a collar fitted over the upper plaited end of the bottle, and a disk closure positioned intermediate the inner end of the collar and the beading formed by the receptacle being constricted by said wire, as set forth.

In testimony whereof I hereunto affix my signature in the presence of two witnesses.

LUTHER P. BROWN.

Witnesses:
  LILLIE MAE BROWN,
  GEORGE S. CLARK.